(12) United States Patent
Palatov et al.

(10) Patent No.: US 12,264,939 B2
(45) Date of Patent: Apr. 1, 2025

(54) DIGITAL MAP FOR NAVIGATION INCLUDING PERMEABILITY ATTRIBUTE NUMERICALLY REPRESENTING AN ABILITY OF A BOUNDARY TO BE TRAVERSED

(71) Applicant: SECOND BRIDGE INC., Beverly Hills, CA (US)

(72) Inventors: Dennis Palatov, Portland, OR (US); Marc Ganouna, Beverly Hills, CA (US)

(73) Assignee: SECOND BRIDGE INC., Beverly Hills, CA (US)

( * ) Notice: Subject to any disclaimer, the term of this patent is extended or adjusted under 35 U.S.C. 154(b) by 365 days.

(21) Appl. No.: 17/791,196

(22) PCT Filed: Jan. 15, 2021

(86) PCT No.: PCT/IB2021/050280
§ 371 (c)(1),
(2) Date: Jul. 6, 2022

(87) PCT Pub. No.: WO2021/148912
PCT Pub. Date: Jul. 29, 2021

(65) Prior Publication Data
US 2023/0031344 A1 Feb. 2, 2023

(30) Foreign Application Priority Data
Jan. 23, 2020 (FR) ........................................ 2000663

(51) Int. Cl.
*G01C 21/00* (2006.01)
(52) U.S. Cl.
CPC ................................ *G01C 21/3881* (2020.08)

(58) Field of Classification Search
CPC .................................................... G01C 21/3881
USPC ............................................................ 701/409
See application file for complete search history.

(56) References Cited

U.S. PATENT DOCUMENTS

| | | | | |
|---|---|---|---|---|
| 6,230,097 B1 * | 5/2001 | Dance | ..................... | G01C 21/26 701/538 |
| 7,805,220 B2 * | 9/2010 | Taylor | ................... | G05D 1/0274 318/568.17 |
| 8,311,741 B1 * | 11/2012 | Lawther | ........... | G08G 1/096811 701/527 |
| 11,537,134 B1 * | 12/2022 | Wiest | .................... | G06N 3/0455 |

(Continued)

FOREIGN PATENT DOCUMENTS

| | | | | |
|---|---|---|---|---|
| DE | 112019001657 T5 * | 1/2021 | ........ | B60W 30/0956 |
| WO | WO-2016077798 A1 * | 5/2016 | ............. | G02B 27/01 |

OTHER PUBLICATIONS

David Graham, "OGC Common DataBase Volume 1 Main Body," Open Geospatial Consortium, Jul. 22, 2015, pp. -476, Retrieved from the Internet: URL:http://www.opengis.net/doc/BP/cdb-vol1/1.0.

*Primary Examiner* — Richard A Goldman
(74) *Attorney, Agent, or Firm* — H&I PARTNERS; Chai Im; C. Andrew Im (57) ABSTRACT

A digital map representing a physical location as a hierarchical structure of cells. Each cell has attributes including but not limited to permeability in each direction of a three-dimensional coordinate system and associated with one or more faces or edges of a boundary. The permeability pertains separately to transmissions of radio frequency signals and to physical travel of objects and persons.

11 Claims, 9 Drawing Sheets

| | | | | |
|---|---|---|---|---|
| | Origin | Origin | Origin | Origin |
| | Size | X | Y | Z |
| 110 | Face 1 | Perm In | Perm Out | Perm RF |
| 120 | Face 2 | Perm In | Perm Out | Perm RF |
| 130 | Face 3 | Perm In | Perm Out | Perm RF |
| 140 | Face 4 | Perm In | Perm Out | Perm RF |
| 150 | Face 5 | Perm In | Perm Out | Perm RF |
| 160 | Face 6 | Perm In | Perm Out | Perm RF |
| 500 | Floor Z | | | |
| 530 | Face 3 Z | | | |
| 540 | Face 4 Z | | | |
| 550 | Face 5 Z | | | |
| 560 | Face 6 Z | | | |

(56) References Cited

U.S. PATENT DOCUMENTS

| | | | | |
|---|---|---|---|---|
| 11,989,017 | B2* | 5/2024 | Ko | B60L 53/30 |
| 12,061,486 | B2* | 8/2024 | Huang | G05D 1/024 |
| 2008/0024491 | A1* | 1/2008 | Sathe | G06T 17/20 |
| | | | | 345/421 |
| 2009/0143932 | A1* | 6/2009 | Sekiya | G05D 1/0246 |
| | | | | 701/26 |
| 2012/0130944 | A1* | 5/2012 | Masuda | G01C 21/3878 |
| | | | | 707/E17.01 |
| 2016/0005223 | A1* | 1/2016 | Gaiter | G01C 21/3673 |
| | | | | 345/427 |
| 2016/0101570 | A1* | 4/2016 | Iorio | B29C 64/393 |
| | | | | 700/98 |
| 2016/0232412 | A1* | 8/2016 | Nishijima | G06V 20/56 |
| 2016/0232413 | A1* | 8/2016 | Ito | G06V 20/588 |
| 2016/0282868 | A1* | 9/2016 | Yamamura | G05D 1/0274 |
| 2019/0156129 | A1* | 5/2019 | Kakegawa | G06V 20/588 |
| 2019/0258262 | A1* | 8/2019 | Vicenti | G05D 1/0242 |
| 2020/0031343 | A1* | 1/2020 | Ogata | G08G 1/167 |
| 2020/0139976 | A1* | 5/2020 | Magnusson | G01C 21/3822 |
| 2021/0100160 | A1* | 4/2021 | Kang | G05D 1/0219 |
| 2021/0124354 | A1* | 4/2021 | Munich | G05D 1/227 |
| 2021/0181741 | A1* | 6/2021 | Yao | G05D 1/0214 |
| 2021/0276574 | A1* | 9/2021 | Efrat Sela | B60W 10/20 |
| 2021/0287385 | A1* | 9/2021 | Watson | G05D 1/0274 |
| 2022/0090937 | A1* | 3/2022 | Lazaridis | G01C 21/3826 |
| 2022/0126811 | A1* | 4/2022 | Osterkamp | G01C 21/3848 |
| 2022/0268587 | A1* | 8/2022 | Konishi | G01C 21/3859 |
| 2022/0291016 | A1* | 9/2022 | Mori | G01C 21/3859 |
| 2022/0412770 | A1* | 12/2022 | Li | G01C 21/3807 |
| 2023/0031344 | A1* | 2/2023 | Palatov | G01C 21/383 |
| 2023/0243658 | A1* | 8/2023 | Yilmaz | G01C 21/005 |
| | | | | 701/400 |
| 2023/0345864 | A1* | 11/2023 | Chen | G05D 1/028 |
| 2023/0347514 | A1* | 11/2023 | Xiao | G05D 1/229 |
| 2024/0045433 | A1* | 2/2024 | Lai | G05D 1/243 |
| 2024/0085190 | A1* | 3/2024 | Wu | G01C 21/206 |
| 2024/0085209 | A1* | 3/2024 | Misumi | G08G 1/16 |
| 2024/0126290 | A1* | 4/2024 | Motoyama | G05D 1/6484 |

\* cited by examiner

| Map Origin | Longitude | Latitute | Elevation |
|---|---|---|---|
| Group 1 | | | |
| ... | | | |
| ... | | | |
| Group N | | | |

FIG. 7

| Group Origin | Group X Form | Cell 1 | ... | ... | Cell N |
|---|---|---|---|---|---|
| | Angle X North | | | | |
| Map X | Map Y | Map Z | | | |

DIGITAL MAP FOR NAVIGATION INCLUDING PERMEABILITY ATTRIBUTE NUMERICALLY REPRESENTING AN ABILITY OF A BOUNDARY TO BE TRAVERSED

RELATED APPLICATIONS

This application is a § 371 application of PCT/IB2021/050280 filed Jan. 15, 2021, which claims priority from French Patent Application No. 2000663 filed Jan. 23, 2020, each of which is incorporated herein by reference in its entirety.

FIELD OF THE INVENTION

The present invention relates to means and methods for navigation utilizing digital maps.

BACKGROUND OF THE INVENTION

The use of maps for navigation is well known. A map is an informational representation of a physical location or space, which, given a known location relative to the map facilitates the planning of a route from current location to a desired destination. A map typically provides reference information, such as longitude and latitude coordinates, landmarks, street names, electronic beacon locations and the like. This reference information can be used to determine a location relative to the map by observing the relevant characteristics of the physical space or location and comparing them to information represented in the map.

Digital maps customarily contain a visualization component, normally in the form of image tiles that can be displayed on a screen. The tiles can contain symbolic representation of physical location features, satellite or aerial images, or combination of the like.

Commonly known digital maps also contain navigational information, such as traversable routes typically represented as segments. Segments typically represent a portion of a roadway and have parameters associated with them such as distance, direction, and time to traverse. Time to traverse is often updated by gathering data on traffic conditions and the like.

Route planning between a known location and desired destination is typically accomplished by evaluating all possible sequences of navigable segments and determining which sequence results in the least total distance or the least total transit time.

Determining a location on a common type of digital map is typically accomplished by obtaining coordinates via a location service such as GPS and then comparing the coordinates to those represented on a map. A further refinement is sometimes done by constraining locations to navigable segments as a way of minimizing errors inherent in obtaining coordinates. This is done by making the assumption that travel is most likely to only occur along those segments.

Some digital maps, particularly those used for indoor locations where GPS is not available, also include information pertaining to radio signals or magnetic fields prevalent at particular locations on the map. Location is then determined by comparing observed radio signals or magnetic fields with those represented on the map. Commonly such maps are stored in a large centrally-controlled processing facility. Observations of signal environment from a device are transmitted to such facility, where they are compared with stored map data. If a location is determined as a result, it is transmitted back to the device as map coordinates. The amounts of data required, and the complexity of the algorithms required for such methods typically preclude performing this determination directly on the device. \Sensor fusion such as data from accelerometers, gyroscopes and the like, is often used to aid navigation in portions of the map where radio or magnetic environments are not known or cannot be reliably discerned due to obstructions or interference. While useful, such techniques are limited by the inherent error accumulation and therefore can only maintain accuracy for short periods of time in the absence of additional constraints.

In some physical environments, particularly indoor and closed-perimeter locations such as ports, storage facilities and the like, travel is often not constrained to specific linear segments. Therefore, there is usually not a useful assumption that can be made about likely travel paths in order to counteract errors.

Further, such facilities tend to block or severely limit radio signals and in particularly GPS signals, so the likelihood of navigational errors is greatly increased while means of counteracting them are reduced.

Additionally, such facilities tend to have multi-level structures where simple longitude and latitude coordinates do not provide a unique location.

For example, a vehicle entering a multi-level parking structure at a shopping mall or airport to pick up a rider cannot use GPS to determine what level it is on, or whether the rider is on the same level, or on the same or opposite side of a street or building.

What is needed is a digital map representation that captures the essential characteristics of the physical environment which can provide useful constraints to likely travel of objects and persons within that environment, as well as likely reliability of radio navigational signals, in order that positioning errors may be identified and their effect minimized. The desired map would further provide the information needed to plot a course to a desired destination on the map, and to monitor progress along that course.

The digital map of the present invention and the corresponding methods for navigation using such map which are disclosed herein answer this need.

SUMMARY OF THE INVENTION

The terms "invention", "the invention", "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the detailed description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

A first objective of the present invention is to provide a digital map representation of a physical environment that captures the essential characteristics of said environment which can provide useful constraints to likely travel of objects and persons within that environment, as well as likely reliability of radio navigational signals, in order that positioning errors may be identified and their effect minimized.

A second objective is to provide a digital map structure that would further contain the information needed to assist in plotting a course to a desired destination on the map, and to monitor progress along that course.

The invention relates to a digital map representing a physical location as a hierarchical structure of cells, each cell having attributes including but not limited to permeability in each direction of a three dimensional coordinate system, and associated with one or more faces or edges of a boundary, said permeability pertaining separately to transmissions of radio frequency signals and to physical travel of objects and persons.

Definition of Terms

The following terms, when used in the context of the present invention, have only the specific meanings listed below, without regard for any other meanings the terms may commonly have in any other context.

Physical Location is a three-dimensional area of interest that is represented by a Map for the purpose of navigation within said area. A Physical Location may comprise one or more rooms, buildings, roadways, pathways, structures, open areas and the like.

Cell is a two-dimensional area or three-dimensional volume of physical space within a Physical Location that is represented by a Cell Data Structure within a Map. Cell Boundaries are typically defined in accordance with the requirements of particular embodiments. Some embodiments will define Cells as substantially rectangular planar shapes having two pairs of orthogonal Edges. Other embodiments will define Cells as substantially rectangular volumes having three pairs of planar Boundary Faces, each pair being normal to an axis of a three-dimensional coordinate system. Some embodiments will define non-rectangular Cell boundaries. A Cell coordinate system need not be aligned with Map coordinate system. In some embodiments, adjacent Cells having the same alignment of axes will be combined into Groups with reference to a shared Group coordinate system having a Group Origin.

Group is a combination of a plurality of Cells within a Physical Location that share coordinate system axis alignment and other characteristics. A Group may comprise a plurality of Cells along any or all of the three coordinate system axes. All Cells within a Group need not be physically contiguous. A Group is represented within a Map by a Group Data Structure.

Map is the total collection of digital data organized in accordance with the present invention to numerically represent the characteristics of a Physical Location. A Map of the present invention may comprise one or more Cell Data Structures. Cell Data Structures may be further combined into Group Data Structures pursuant to specific requirements of particular embodiments.

A Map of the present invention is intended for computing the paths of planned movement of objects and persons, as well as transmission of radio and other signals.

Figure 1:
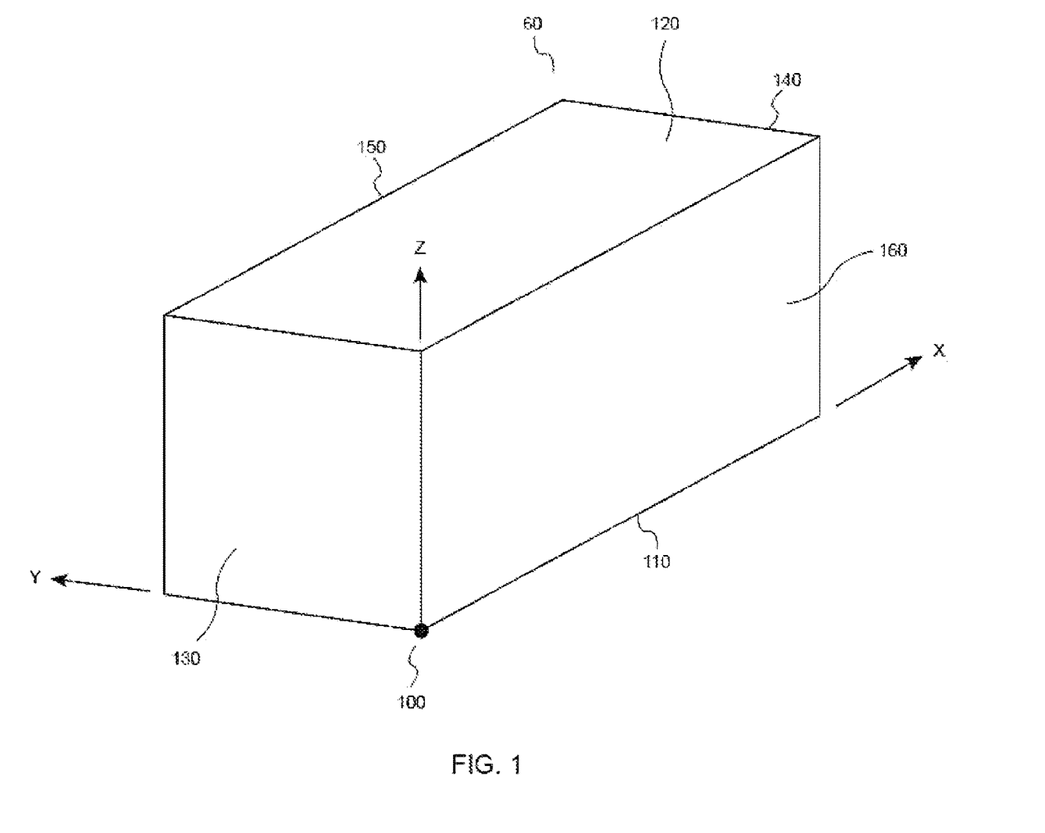
FIG. 1 is an illustration of a three-dimensional Cell 60 aligned with a 3-dimensional coordinate system having origin 100 and Boundary Faces 110, 120, 130, 140, 150 and 160.

Boundary is the two-dimensional or three-dimensional envelope that defines a Cell. In many embodiments, a three-dimensional Boundary will have six planar Faces, as illustrated in FIG. 1—a pair for each of the three coordinate axes, normal to the respective axis. Other embodiments may have non-linear, non-planar or non-orthogonal Boundary Faces while remaining within the scope of the present invention. In some embodiments some Boundary Faces of some Cells may coincide with physical walls, floors, ceilings, barriers, lane dividers, terrain features and the like.

Two-dimensional Cell Boundaries are within the scope of the present invention, with the Boundary in those embodiments being defined by Edges on a planar surface rather than Faces. Two-dimensional boundaries are not illustrated in the drawings or detailed descriptions since their implementation will be readily apparent to those skilled in the art with reference to the illustrated three-dimensional embodiments or the present invention. Similarly non-linear, non-planar and non-orthogonal boundaries are not illustrated herein but remain within the scope for the present invention.

Within a Cell Data Structure, Cell Boundaries are represented as data sets which contain numerical values such as coordinates of Boundary endpoints. Such values are used in computationally planning movement of objects or persons, transmission of signals, and the like.

Permeability is an attribute of a Boundary, Boundary Edge or Boundary Face, and has one or more aspects recorded collectively as data in an associated Data Structure within a Map. In some embodiments, the Permeability attribute reflects physical movement, which is the ability of physical objects of varying types such as persons, vehicles and cargo to traverse a specific Boundary. Different Permeability values may be recorded for different types of objects and may further reference an associated speed and direction of travel.

Some embodiments will include Radio Frequency (RF) signal permeability attributes for Boundaries. This is a measure of the extent to which a radio signal is blocked or is able to traverse a Boundary. RF Permeability can be further separated by frequency or other characteristics in particular embodiments.

Additional Permeability aspects are possible in some embodiments, including those for sound, light, and the like.

Within the present invention, Permeability is represented as a numerical value associated with a Boundary data set within a Cell Data Structure within a Map. The numerical value of Permeability represents the ability of its associated agent type such as object, person or signal, to traverse the Boundary.

In the case of a moving object or person, the numerical value of Permeability may be used in computing whether the object or person is able to traverse the Boundary, and if so in which direction and at what speed. Various embodiments will assign particular meanings and interpretations to the numerical value that are appropriate to the embodiment.

In the case of signal Permeability, the numerical value may represent the signal attenuation or obstruction, if any, that occurs at the Boundary for the specific type of signal.

A Boundary data set in a Cell Data Structure may contain multiple Permeability values, each associated with the specific type of object or signal that may be appropriate for the embodiment.

BRIEF DESCRIPTION OF THE DRAWINGS

The invention will be better understood when reading the following description and examining the annexed Figures. These Figures are given only as an illustration and by no means as a restriction of the invention.

Identical, similar, or analogous elements share the same reference number throughout the Figures.

DETAILED DESCRIPTION OF THE REPRESENTATIVE EMBODIMENTS OF THE INVENTION

Figure 2:
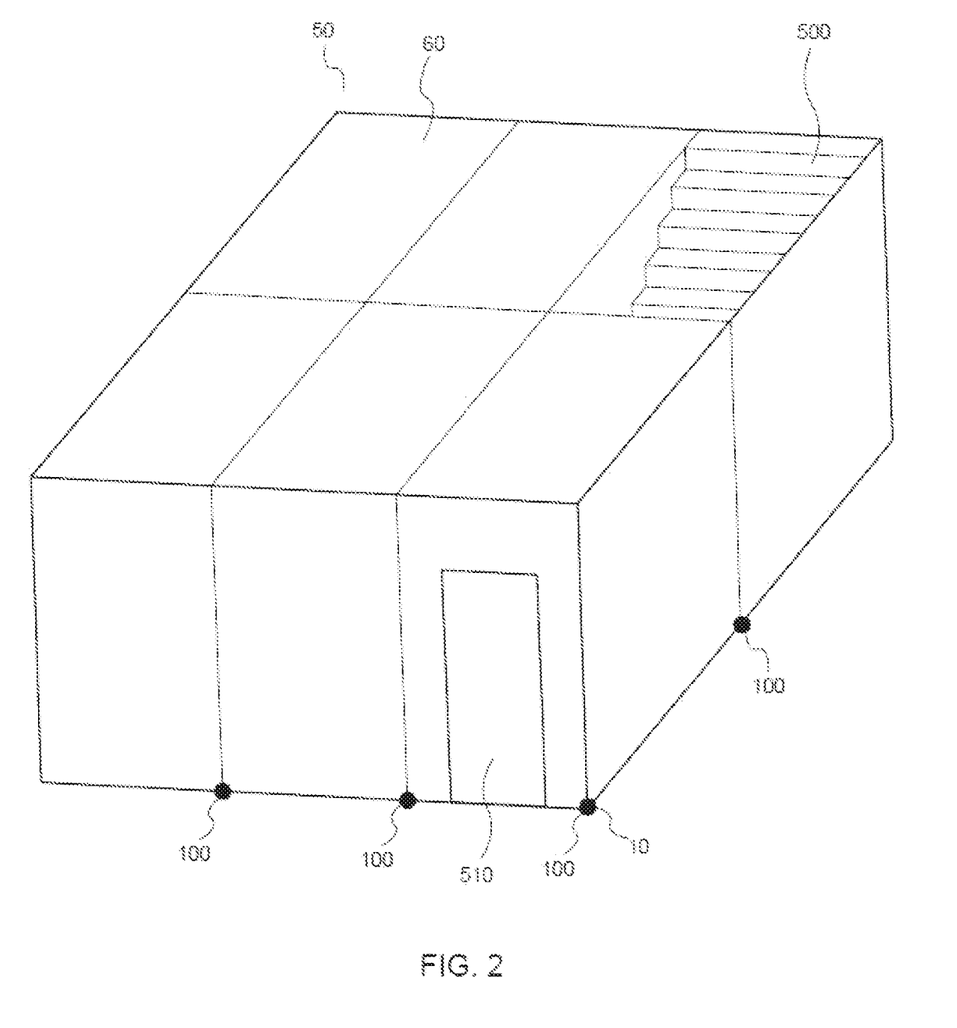
FIG. 2 illustrates a single story of a building represented as a Group 50 of Cells 60, having Group Origin 10, with one cell having an entryway 510 and another cell having a stairway floor 500.

FIG. 1 shows a first representative embodiment of a digital map of a single story of a multi-level building. FIG. 2 illustrates diagrammatically how the map of the present invention represents a physical space 20 as a Group 50 of Cells 60, having Group Origin 10, with one cell having an entryway 510 which indicates a transition path to the exterior, and another cell having a stairway floor 500, which indicates a transition path to an upper level. Each transition path is represented as a permeability attribute of the corresponding Cell Face in the Cell Boundary.

Figure 4:
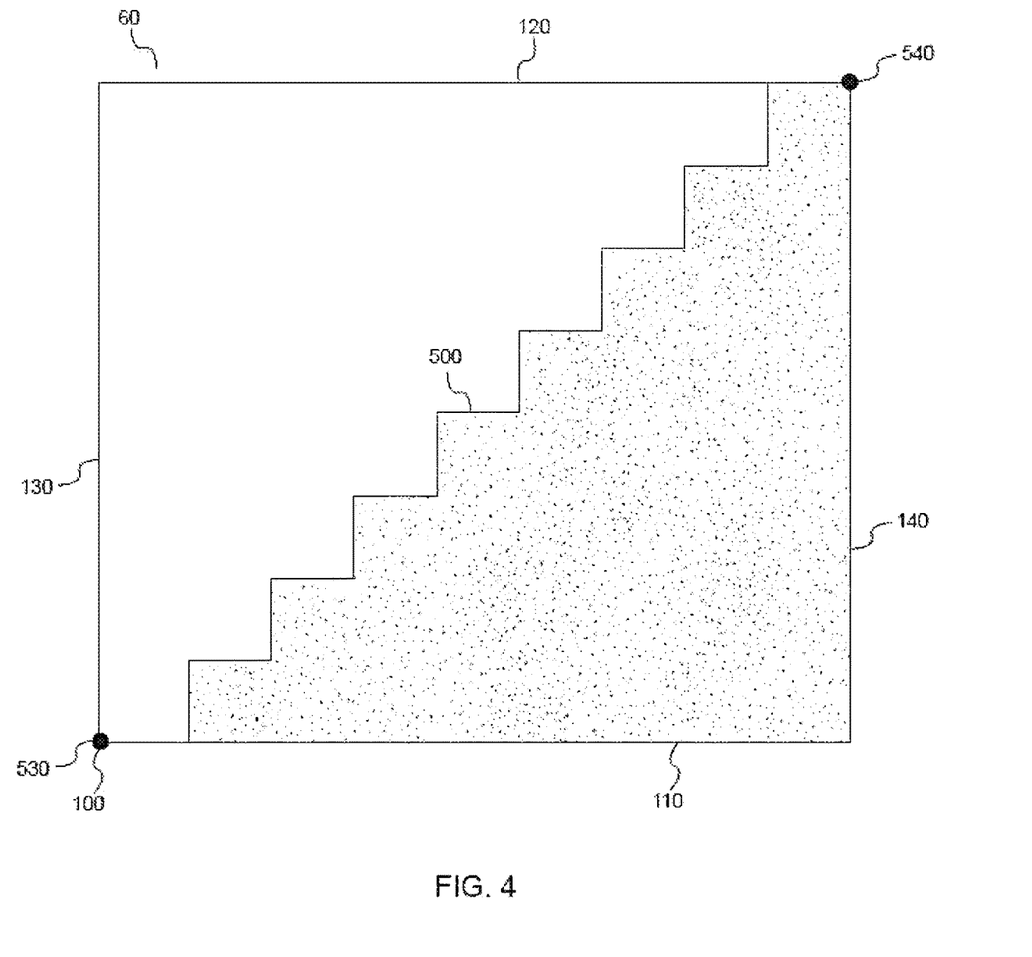
FIG. 4 illustrates a Cell 60 having a stairway floor 500 with Boundary Face floor heights 530 and 540, permeable top Boundary Face 120 and left Boundary Face 130, and impermeable right Boundary Face 140 and bottom Boundary Face 110.

The cell representing a stairway is further illustrated in FIG. 4. Shown is a Cell 60 having a stairway floor 500 with Boundary Face floor heights 530 and 540, permeable top Boundary Face 120 and left Boundary Face 130, and impermeable right Boundary Face 140 and bottom Boundary Face 110.

Figure 7:
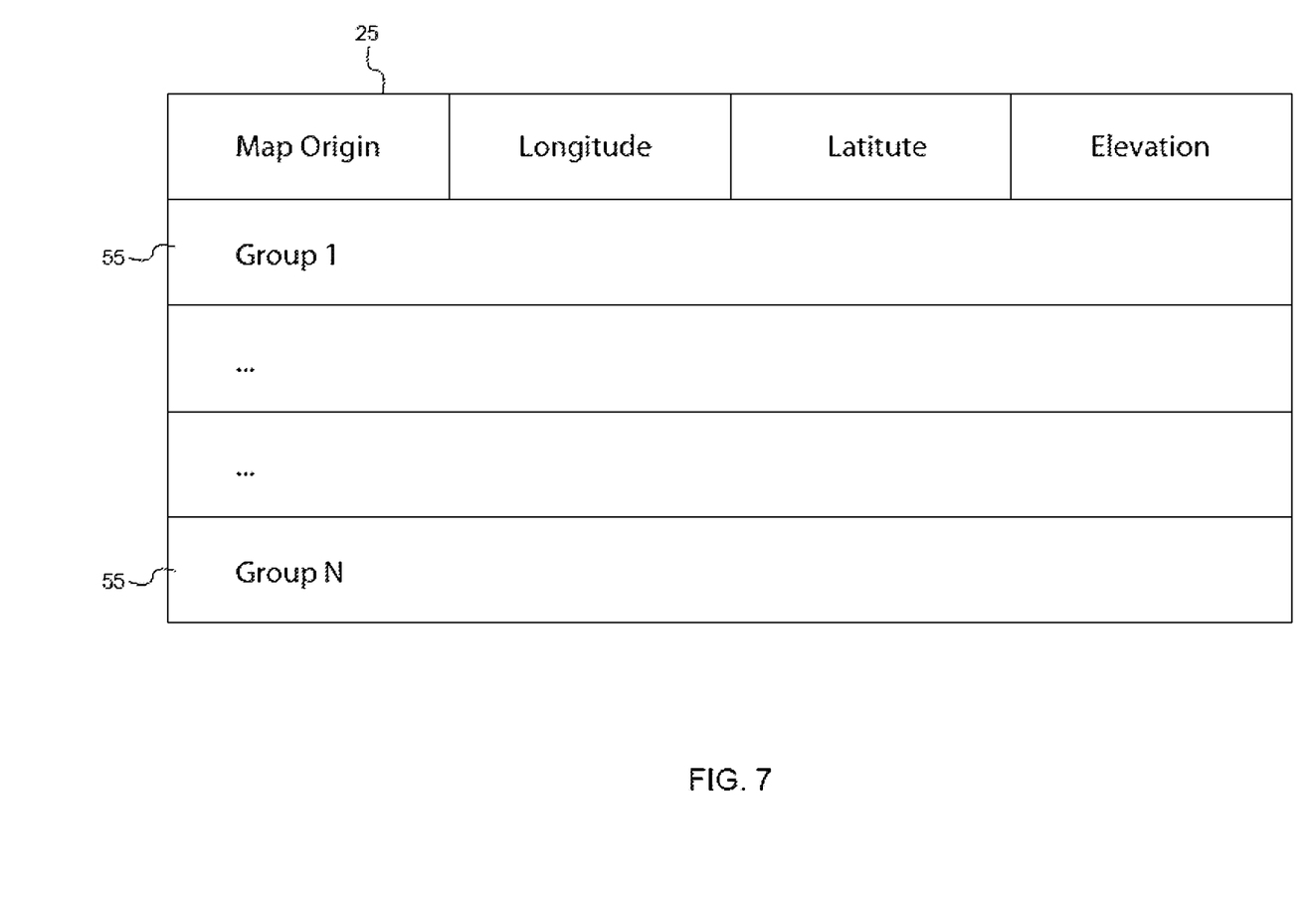
FIG. 7 is a block diagram of a Map Data Structure 25 comprising illustrative Map Data and a plurality of Group Data Structures 55.
Figure 8:
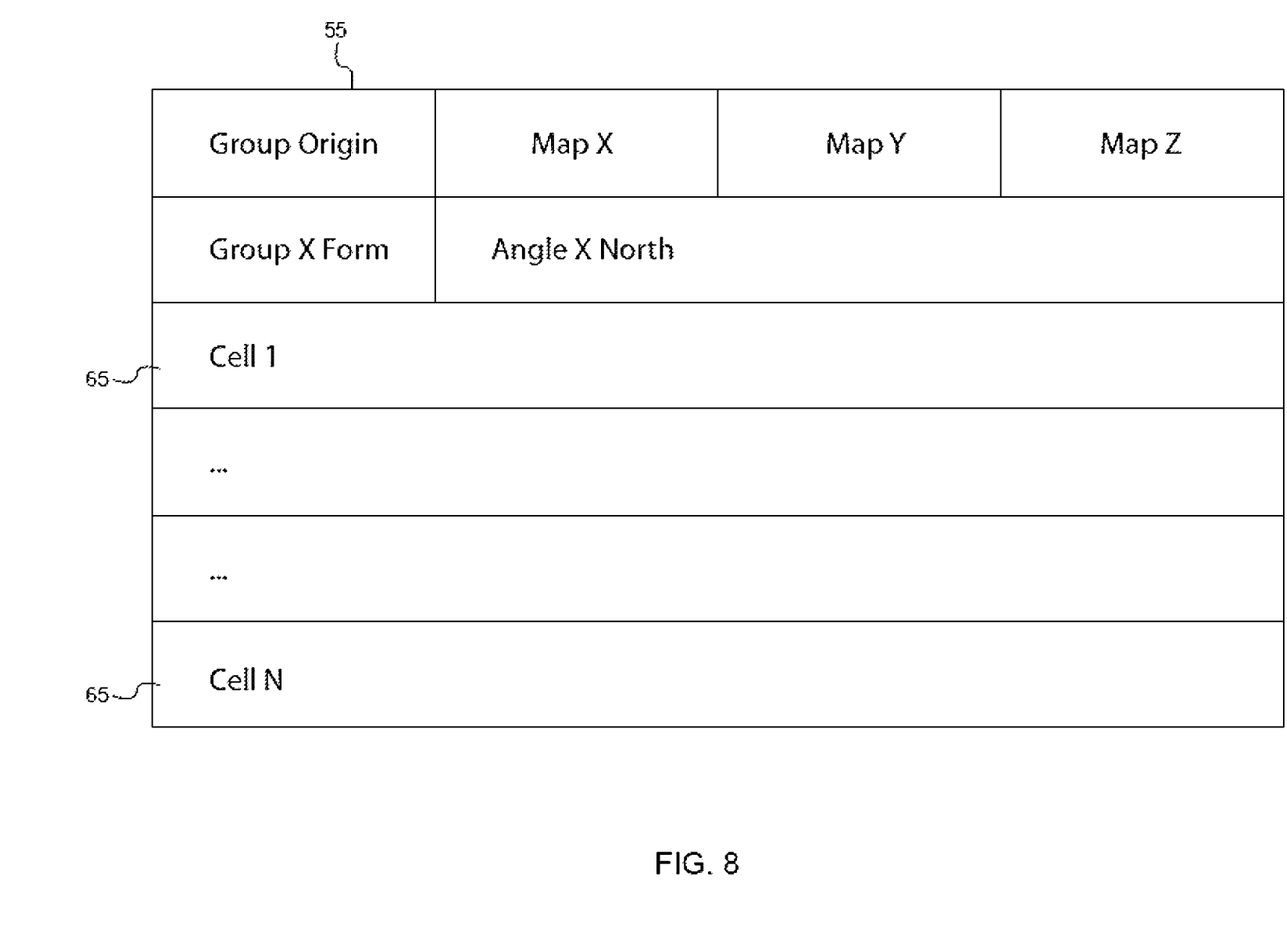
FIG. 8 is a block diagram of a Group Data Structure 55 comprising illustrative Group Data and a plurality of Cell Data Structures 65.
Figure 9:
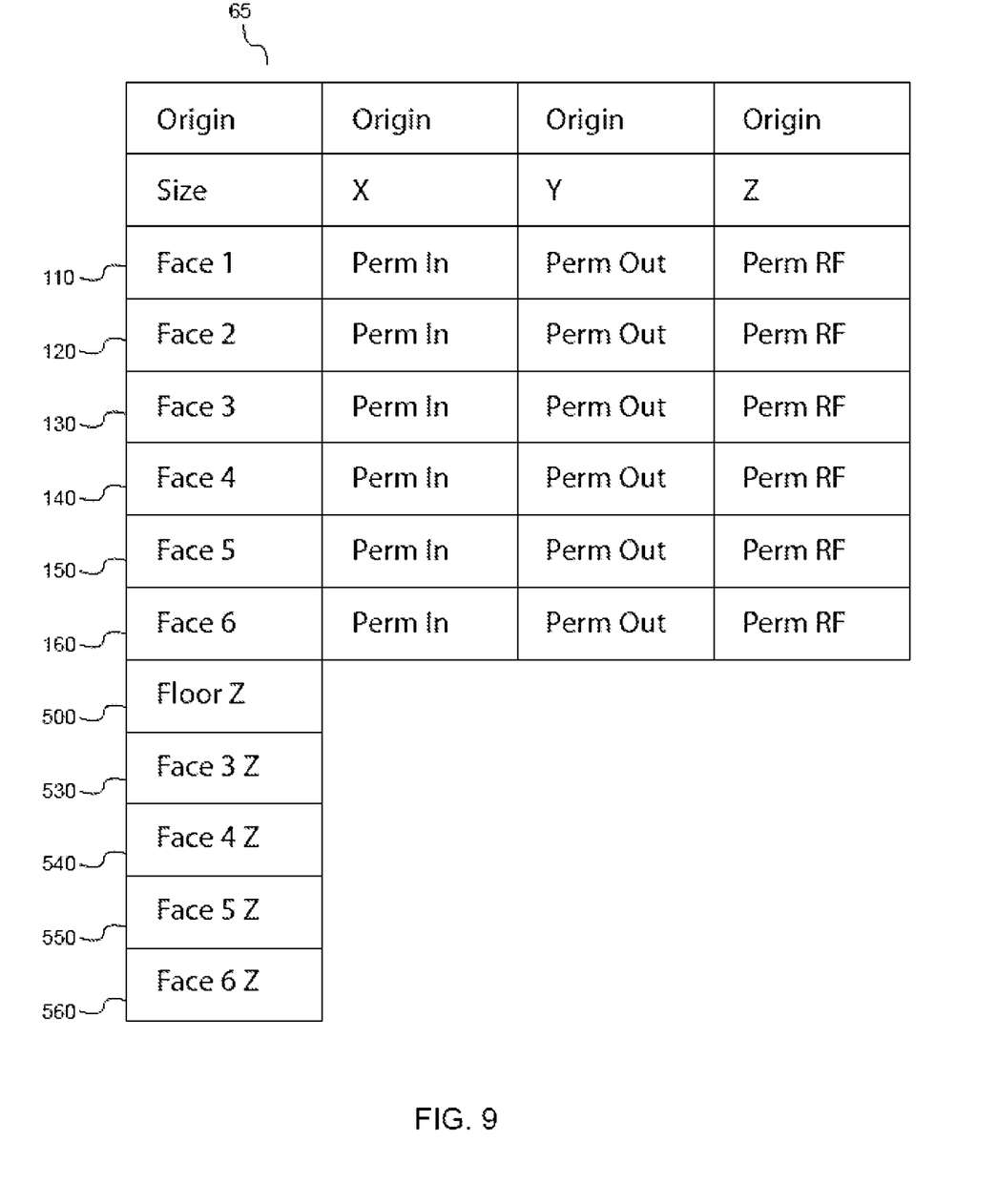
FIG. 9 is a block diagram of an illustrative Cell Data Structure 65.

FIG. 8 is a diagrammatic representation of the Group data structure of the digital map of the embodiment. FIG. 9 is an illustration of a data structure corresponding to each Cell in the Group. It shall be obvious to one skilled in the art how to combine the representations of multiple levels, each level having its corresponding Group data structure, into an overall map data structure illustrated in FIG. 7.

Figure 5:
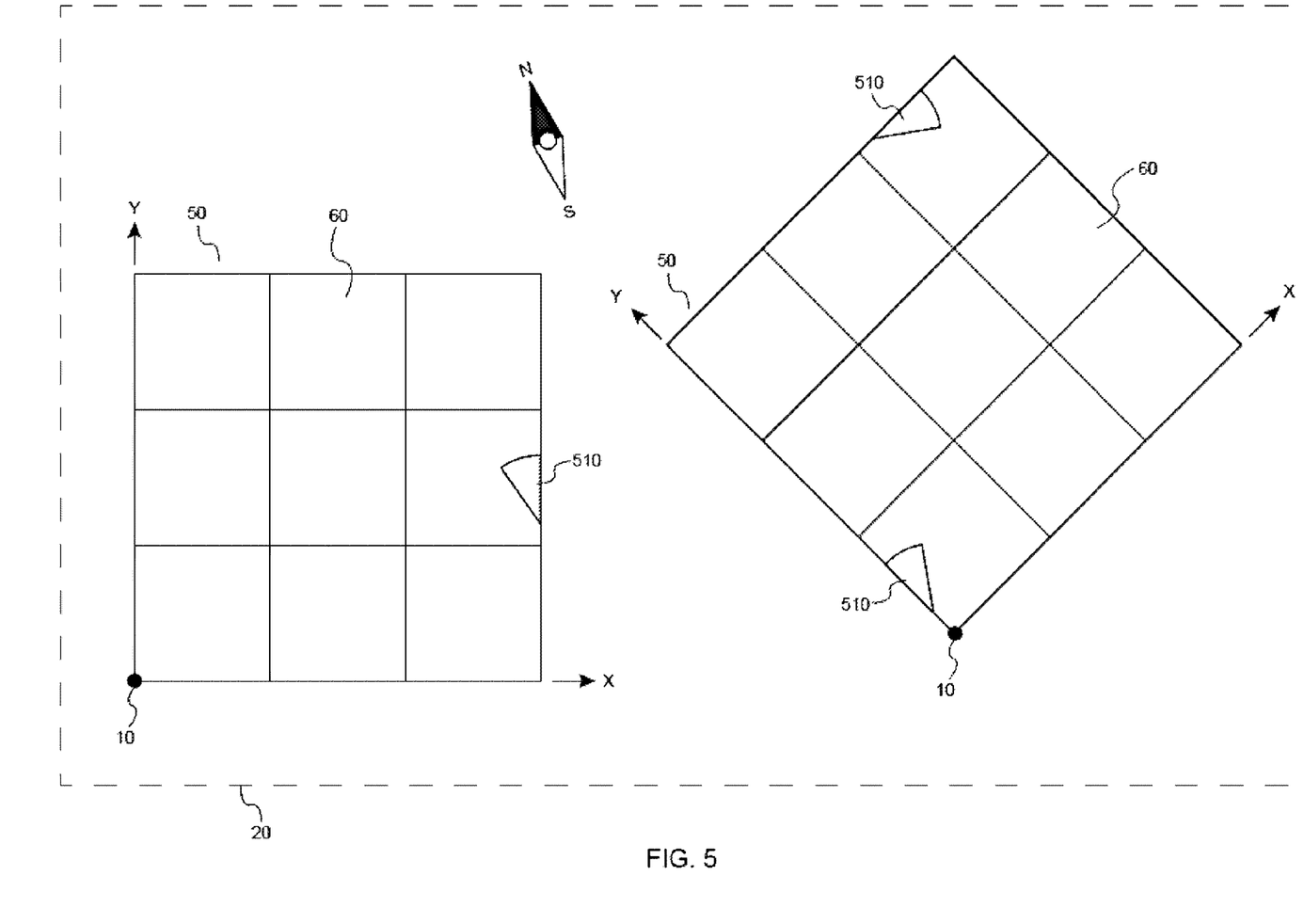
FIG. 5 shows a plan view of a Physical Location 20 having two distinct Groups 50 of Cells 60.

FIG. 5 shows a plan view of a Physical Location 20 having two distinct Groups 50 of Cells 60, which is representative of a campus having a plurality of buildings or outdoor areas through which objects and signals may transit.

In some embodiments, electronic devices may be located in various locations corresponding to specific cells on the map. It may be desirable to transmit electronic messages between two such devices which are not in direct transmission range of each other. By evaluating signal Permeability values for the cell boundaries which lie between the source and the destination, and knowing the locations of candidate relay devices, an optimized relay chain of intermediary devices can be computed to ensure most efficient transmission of the message.

Figure 3:
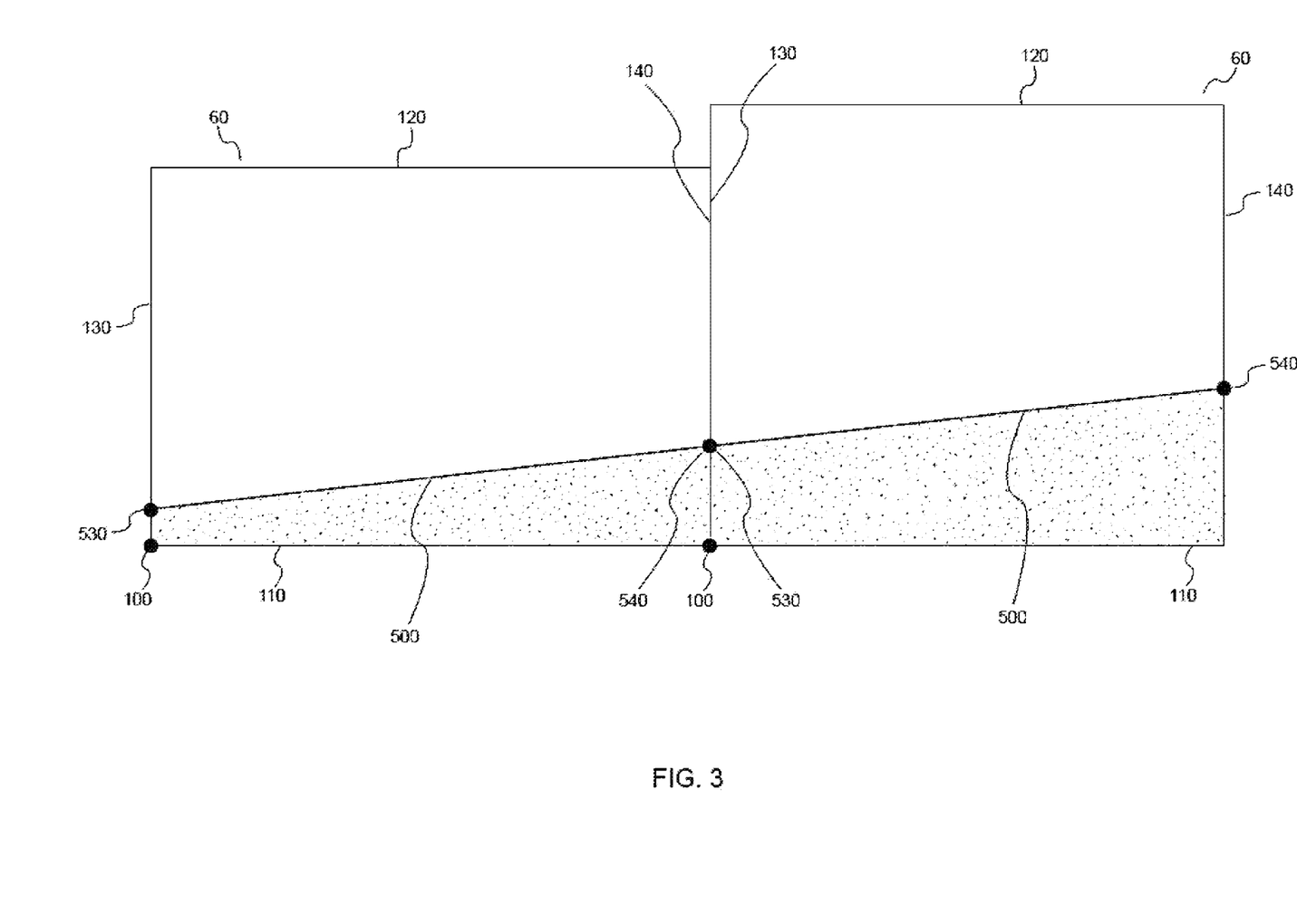
FIG. 3 is an elevation view of two Cells 60, each Cell having a sloping floor 500 with different Boundary Face floor heights 530 and 540.

A representative embodiment having a sloping floor is illustrated in FIG. 3. Shown is an elevation view of two Cells 60, each Cell having a sloping floor 500 with different Boundary Face floor heights 530 and 540. The Cell data structure illustrated in FIG. 9 incorporates Z axis attributes for floor height as well as interior height associated with each face. It shall be obvious to one skilled in the art how the illustrated Cell data structure may be extended to include individual floor Z attributes associated specifically with each face.

Figure 6:
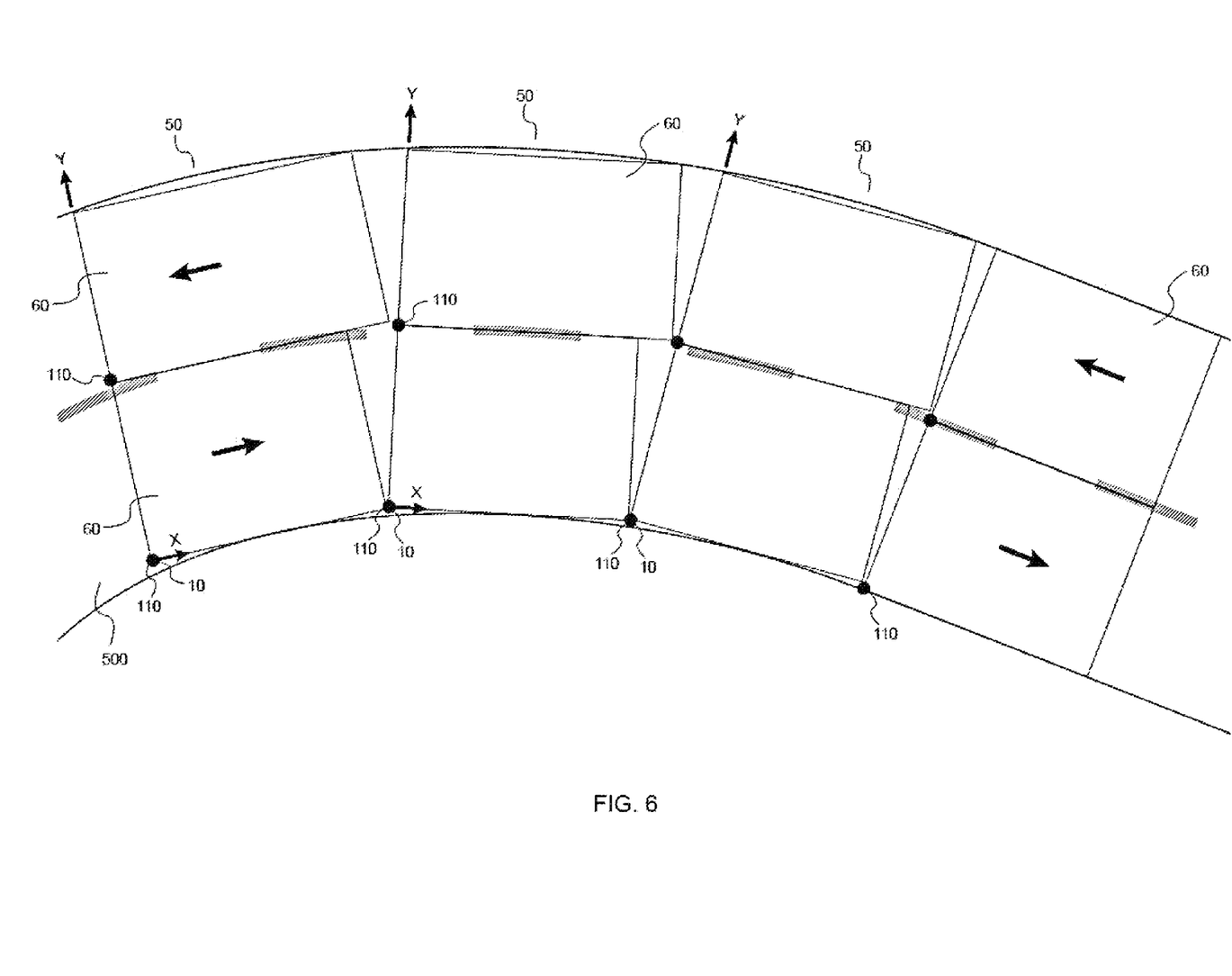
FIG. 6 is a plan view illustration of an embodiment representing a curved bi-directional roadway as a plurality of Groups 50 of Cells 60, each Group having a distinct coordinate system with origin 10 and cells of varied size to best represent the physical roadway.

An embodiment representing a curved bi-directional roadway as a plurality of Groups 50 of Cells 60, each Group having a distinct coordinate system with origin 10 and cells of varied size to best represent the physical roadway. The illustration shows how orthogonal Cells may be used to represent non-orthogonal spaces within the context of the present invention. Non-orthogonal cell representations conforming to physical space features are also possible, at the cost of additional data necessary to represent the boundary. Such representations are well known in the art.

The use of directional permeability attribute is also illustrated in FIG. 6, with direction corresponding to the designated direction of travel for each lane of the roadway. A speed limit attribute may also be incorporated.

A representative use of numerical Permeability value may include determining the trustworthiness of positional information such as GPS signal. If a vehicle was known to be located in a location associated with a first cell on the map at a known point in time and receives GPS information that it is now located in a location associated with a second cell. The numerical permeability of each cell boundary between last known location and current reported location can be first evaluated to determine whether a valid path between the two locations exists. If no path exists, the GPS reported location can be assumed to be erroneous.

If a valid path exists, the numerical values for speed across the cell boundaries can then be evaluated, and it can be determined whether the vehicle could have reasonably traveled between the two locations in the time available. If the answer is no, the reported GPS location would be considered not trustworthy.

Finally, if the GPS signal permeability of the top face of the cell where the vehicle is reported to be located is low, representing an overhead signal obstruction, the quality of the signal can be assumed to be low and the reported location less trustworthy.

The digital Map and the corresponding data structure can be stored in a memory device 200 (cf. FIG. 9). The memory device 200 can be, for example but not limited to, an electronic, magnetic, optical, electromagnetic, infrared, or semiconductor system, apparatus or device. More specific examples (a non-exhaustive list) of the memory device 200 include the following: a portable computer diskette; a random access memory; a read-only memory; an erasable programmable read-only memory (or Flash memory); and a portable compact disc read-only memory. The memory device 200 is a computer-usable or computer-readable medium.

More specifically, the invention relates to a digital Map representing a physical space 20, said map comprising Data Structures 65 corresponding to a plurality of Cells 60, each said Cell 60 corresponding to a particular location within said physical space 20, each said Cell 60 further having a Boundary, said Boundary further having at least a Permeability attribute recorded in a Data Structure.

According to a particular embodiment, said Boundary of each of said Cells 60 is two dimensional.

According to a particular embodiment, said two dimensional Boundary comprises a plurality of Edges, each said Edge having at least a Permeability attribute recorded in a Data Structure.

According to a particular embodiment, said Boundary of each of said Cells 60 is three dimensional.

According to a particular embodiment, said Boundary comprises a plurality of Faces (110, 120, 130, 140, 150, 160), each said Face (110, 120, 130, 140, 150, 160) having at least a Permeability attribute recorded in a Data Structure.

According to a particular embodiment, said Permeability attribute pertains to physical movement of objects.

According to a particular embodiment, said Permeability attribute pertains to a particular type of objects.

According to a particular embodiment, said Permeability attribute further comprises a reference to speed.

According to a particular embodiment, said Permeability attribute further comprises a reference to direction.

According to a particular embodiment, said Permeability attribute pertains to transmission of radio signals.

According to a particular embodiment, said Permeability attribute pertains to radio signals of a particular frequency.

According to a particular embodiment, Cell Data Structures 65 are further included into Group Data Structures.

The invention also relates to a memory device storing a digital Map according to the invention.

The particular embodiments disclosed herein are illustrative and not limiting; other embodiments shall be readily apparent to those skilled in the art based upon the disclosures made herein, without departing from the scope of the present invention.

The invention claimed is:

1. A non-transitory computer readable storage medium comprising a digital map numerically representing a physical space for a purpose of computational navigation, comprising data structures corresponding to a plurality of cells, each cell corresponding to a particular location within the physical space, said each cell comprising a boundary, the boundary being defined by a first data set of numerical values within a corresponding data structure, the first data set further comprising at least a numerical value for at least a permeability attribute recorded in said corresponding data structure, the permeability attribute numerically representing an ability of the boundary to be traversed; and wherein the permeability attribute pertains to a transmission of radio signals.

2. The non-transitory computer readable storage medium of claim 1, wherein the boundary of said each cell is a two-dimensional boundary.

3. The non-transitory computer readable storage medium of claim 2, wherein the two-dimensional boundary comprises a plurality of edges, each edge having a second data set of numerical values associated with said each edge, the second data set of said each edge comprising at least a numerical permeability attribute, the second data set of said each edge being recorded in the corresponding data structure.

4. The non-transitory computer readable storage medium of claim 1, wherein the boundary of said each cell is a three-dimensional boundary.

5. The non-transitory computer readable storage medium of claim 4, wherein the three-dimensional boundary comprises a plurality of faces, each face comprising a third data set of numerical values associated with said each face, the third data set of said each face comprising at least a numerical permeability attribute, the third data set of said each face being recorded in the corresponding data structure.

6. The non-transitory computer readable storage medium of claim 1, wherein the permeability attribute pertains to a physical movement of objects.

7. The non-transitory computer readable storage medium of claim 6, wherein the permeability attribute pertains to a type of objects.

8. The non-transitory computer readable storage medium of claim 6, wherein the permeability attribute further comprises a reference to speed.

9. The non-transitory computer readable storage medium of claim 6, wherein the permeability attribute further comprises a reference to direction.

10. The non-transitory computer readable storage medium of claim 1, wherein the permeability attribute pertains to the radio signals of a particular frequency.

11. The non-transitory computer readable storage medium of claim 1, wherein the data structures are further comprised into group data structures.

* * * * *